No. 689,389. Patented Dec. 24, 1901.
O. ECKELT.
APPARATUS FOR THE PRODUCTION OF ACCURATE GAGES.
(Application filed Jan. 17, 1901.)
(No Model.)
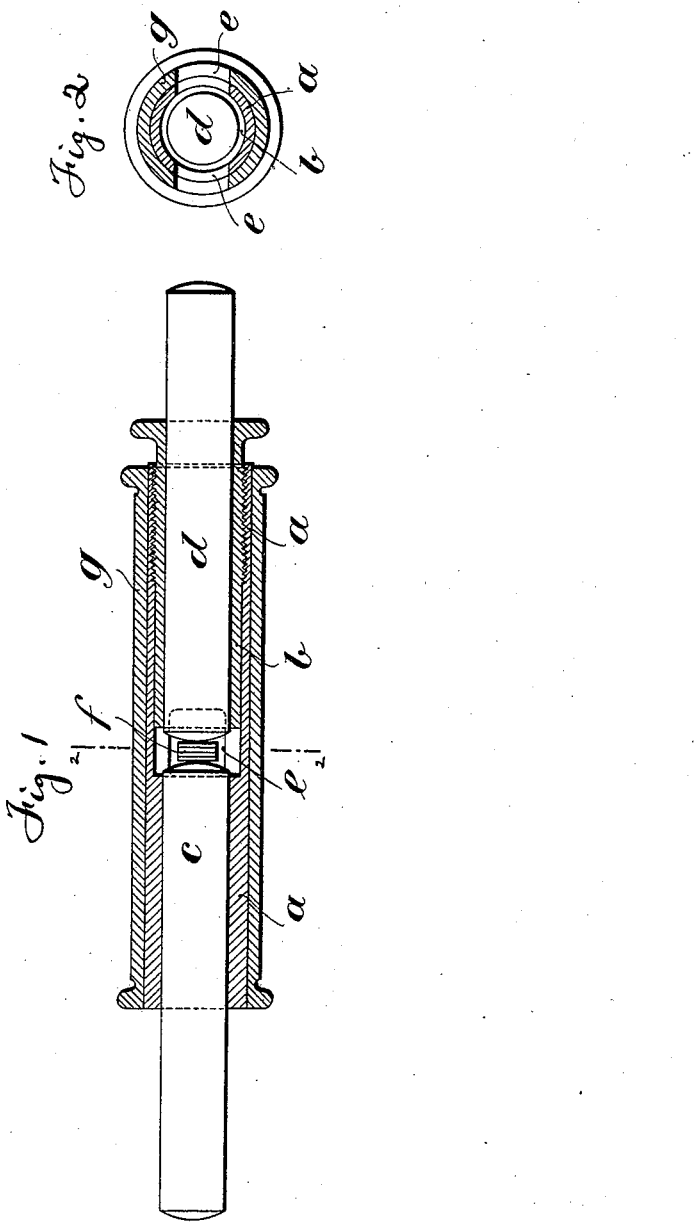

UNITED STATES PATENT OFFICE.

OTTO ECKELT, OF BERLIN, GERMANY.

APPARATUS FOR THE PRODUCTION OF ACCURATE GAGES.

SPECIFICATION forming part of Letters Patent No. 689,389, dated December 24, 1901.

Application filed January 17, 1901. Serial No. 43,583. (No model.)

*To all whom it may concern:*

Be it known that I, OTTO ECKELT, engineer, a subject of the King of Prussia, Emperor of Germany, residing in Hussenstrasse 17 to 20, Berlin, Germany, have invented certain new and useful Improvements in Apparatus for the Production of Accurate Gages Variable at Will, of which the following is a specification.

This invention relates to the production of variable gages as employed in working operations of a technical nature. As these gages must be very accurate, the general practice of producing a special measure for each particular width is very expensive, a disadvantage which is obviated by the employment of variable gages.

It is true that variable gages are already known which are adjusted to a scale by means of micrometrical screws. In these gages the employment of a special measure for each width is certainly dispensed with; but the measurement is wanting in accuracy, as difficulties occur in the manufacture of the screw and scale and still greater difficulties in examining the same, and in consequence of the irregular wearing away of the screws the apparatus after a short time becomes smaller. Moreover, the adjustment to a point on the scale requires more time and a very experienced eye and even then is not reliable. These disadvantages are entirely obviated by my improved exact gages, which can be varied at will.

The gage is composed of two, or in certain cases a larger number, of the well-known rod-shaped end measures and a number of the equally well known flat measures in such a manner that between the end measures held in the same axis a combination of supplementary flat measures is inserted, which completes the extent of the whole measure to be produced. In this manner with the assistance of bar-shaped measures and flat measures thousands of gage measurements may be combined.

In the accompanying drawings the improved gage is illustrated.

Figure 1 is a longitudinal section, and Fig. 2 a cross-section on the lines 2 2 of Fig. 1.

A socket consisting of the parts $a$ and $b$ holds the end measures $c$ and $d$ (which fit into it exactly) in the same axis, and by slight friction they are prevented from falling out. About the middle of the socket in the part $a$ is an opening $e$, through which the small "marking-blocks" $f$ are introduced between the adjoining surfaces of the measures. By screwing the part $b$ into the part $a$ the small blocks and the end measures are caused to be pressed closely together, whereupon when a certain pressure is exceeded the friction of the end measures in the socket is overcome and one of the end measures slides in the part surrounding the same, so that the parts of the end measures lying against the blocks are pressed against the blocks in each case with equal pressure. The whole socket is surrounded by a casing $g$, made of hardened india-rubber or any other poor conductor of heat, in order that the warmth of the hand may not produce any alterations in the length of the measure.

Having now particularly described and ascertained the nature of my said invention and in what manner the same is to be performed, I declare that what I claim is—

1. An improved apparatus for the production of accurate gages variable at will, the same consisting of two removable (or interchangeable) rod-shaped end measures held in the same axial line and combined with flat measures interposed between the end measures, bringing the total measure up to that which is to be produced.

2. In an apparatus for the production of accurate gages, the socket holding the end measures with slight friction thereon, said socket being combined with the end measures and with the flat measures and being provided with an opening near the middle of its length, substantially as and for the purposes set forth.

3. In an apparatus for the production of accurate gages, the socket holding the end measures with slight friction thereon, said socket being combined with the end measures and being composed of two parts one of which is threaded into the other for the purpose of adjusting the end measures, substantially in the manner and for the purposes set forth.

4. The combination of the end measures, $c$, $d$, the socket having an opening $e$ and made in two parts, $a$ and $b$, of which one part is threaded into the other, gage-blocks, $f$, located between the inner ends of the rods $c$ and $d$, and the casing, $g$, all arranged for operation substantially as shown and described.

Signed at Berlin this 2d day of January, 1901.

OTTO ECKELT.

Witnesses:
WOLDEMAR HAUPT,
HENRY HASPER.